United States Patent [19]

Lu et al.

[11] Patent Number: 5,789,474
[45] Date of Patent: Aug. 4, 1998

[54] ADDITIVE COMPOSITION AND METHOD FOR INCREASING THE UPPER SERVICE TEMPERATURE OF ADHESIVES

[75] Inventors: Xinya Lu, Spring Valley; Wayne K. Chu, Tarrytown, both of N.Y.

[73] Assignee: Arizona Chemical Company, Panama City, Fla.

[21] Appl. No.: 714,946

[22] Filed: Sep. 17, 1996

Related U.S. Application Data

[63] Continuation-in-part of Ser. No. 535,903, Sep. 28, 1995, abandoned.

[51] Int. Cl.$^6$ .................... C08L 45/00; C08L 71/12
[52] U.S. Cl. ............... 524/270; 524/504; 524/505; 525/67; 525/70; 525/71; 525/89; 525/94; 525/148
[58] Field of Search ............... 524/270, 504, 524/505; 525/67, 70, 71, 89, 94, 148

[56] References Cited

U.S. PATENT DOCUMENTS

| | | | |
|---|---|---|---|
| H1387 | 12/1994 | Hansen et al. | 525/92 |
| 3,257,357 | 6/1966 | Stamatoff | 260/47 |
| 3,257,358 | 6/1966 | Stamatoff | 260/47 |
| 3,306,874 | 2/1967 | Hay | 260/47 |
| 3,306,875 | 2/1967 | Hay | 260/47 |
| 3,361,851 | 1/1968 | Gowan | 260/47 |
| 3,660,531 | 5/1972 | Lauchlan et al. | 250/876 B |
| 4,104,323 | 8/1978 | Hansen | 260/829 |
| 4,141,876 | 2/1979 | Hansen | 260/33.6 |
| 4,166,055 | 8/1979 | Lee, Jr. | 260/511 |
| 4,189,411 | 2/1980 | Haaf | 260/27 R |
| 4,314,926 | 2/1982 | Allison, III | 260/33.6 AQ |
| 4,360,568 | 11/1982 | Allison, III | 428/411 |
| 4,454,284 | 6/1984 | Ueno et al. | 524/427 |
| 4,495,333 | 1/1985 | White | 525/150 |
| 4,728,461 | 3/1988 | Fujii et al. | 252/511 |
| 4,849,486 | 7/1989 | Tsuchiya et al. | 525/152 |
| 4,867,881 | 9/1989 | Kinzer | 210/490 |
| 4,959,412 | 9/1990 | Arter et al. | 525/98 |
| 4,994,508 | 2/1991 | Shiraki et al. | 524/14 |
| 5,084,516 | 1/1992 | Tsuchiya et al. | 525/149 |
| 5,326,813 | 7/1994 | Okada et al. | 524/508 |
| 5,376,724 | 12/1994 | Bailly et al. | 525/132 |
| 5,418,275 | 5/1995 | Okada et al. | 524/504 |
| 5,444,126 | 8/1995 | Okada et al. | 525/391 |

FOREIGN PATENT DOCUMENTS

| | | | |
|---|---|---|---|
| 6-57008 | 3/1994 | Japan | C08J 3/20 |
| 90/14396 | 11/1990 | WIPO | C09J 153/02 |
| 90/14397 | 11/1990 | WIPO | C09J 153/02 |

OTHER PUBLICATIONS

JP-47003136 (Abstract only) (1972).
JP-59-126460 (Abstract only) (1984).
JP-58-129051 (Abstract only) (1987).
JP-58-129050 (Abstract only) (1987).

*Primary Examiner*—Vasu Jagannathan
*Assistant Examiner*—Olga Asinovsky
*Attorney, Agent, or Firm*—Luedeka, Neely & Graham, P.C.

[57] ABSTRACT

The specification discloses an additive composition for use in preparing adhesive formulations, particularly hot melt adhesive formulations based on A-B-A block copolymers which exhibit increased upper service temperatures. The additive composition comprises a preblend of of an A-block compatible reinforcing resin having a number average molecular weight ranging from about 2,000 to about 10,000 Daltons and a polydispersity index of less than about 4.0 and a B-block compatible resin. The A-block compatible reinforcing resin/B-block resin preblend enables introduction of more A-block reinforcing resin into the composition thereby increasing the overall upper service temperature of the adhesive formulation.

10 Claims, 1 Drawing Sheet

5,789,474

ADDITIVE COMPOSITION AND METHOD FOR INCREASING THE UPPER SERVICE TEMPERATURE OF ADHESIVES

This application is a continuation-in-part of application Ser. No. 08/535,903, filed Sep. 28, 1995, now is abandoned.

The present invention relates to additives and methods for increasing the upper service temperature of adhesive compositions.

BACKGROUND

Hot melt and/or pressure sensitive adhesives have gained wide acceptance because they generally do not require the presence of solvents, which tend to evaporate from the adhesives creating environmental concerns.

Hot melt technology allows the adhesive components to be mixed by high shear mixing or melt mixing techniques in commercially available equipment. Once mixed, the adhesives may be applied to a substrate in molten form. Since no solvent is used in the adhesive formulation, there is no solvent to evaporate, hence extended drying times are not required.

While hot melt adhesives generally reduce the pollution problems due to their lack of the need for a solvent, they do suffer some drawbacks. One drawback is that the processing temperatures required to form the composition often adversely affect the adhesive's properties. Processing temperatures in excess of about 180° C. may result in degradation of the composition.

Many hot melt and/or pressure sensitive adhesives contain conjugated diene/monovinyl aromatic copolymers (A-B-A) block copolymers, e.g., styrene-diene block copolymers. Because of the relatively low upper service temperature of A-B-A block copolymers, components such as polyphenylene ether (also known as polyphenylene oxide) have been added in order to increase the service temperature and holding power of the compositions. However, product degradation has been encountered when attempting to blend conventional polyphenylene ethers with A-B-A block copolymers, particularly when the A-B-A block copolymer is a styrene-isoprene-styrene copolymer of the type used in hot melt adhesive compositions.

One approach to incorporating polyphenylene ether into an adhesive composition is disclosed in U.S. Pat. Nos. 4,104,323 and 4,141,876 to Hansen. In his approach, Hansen discloses the use of a pre-blend of polyphenylene ether and an A-block compatible resin. According to Hansen, the A-block compatible resins may be selected from the group consisting of coumaroneindene resins, vinyl toluene-α-methylstyrene copolymers and mixtures thereof.

U.S. Pat. No. 4,314,926 to Allison, III also discloses the use of a mixture of polyphenylene ether and an A-block compatible resin, e.g., poly(alpha-methylstyrene), in order to increase the holding power of a hot melt adhesive formulation.

While a blend of polyphenylene ether and A-block compatible resins may be used for some applications, it has been found that it is extremely difficult to incorporate large amounts of polyphenylene ether into the adhesive composition without excessive oxidative degradation of the A-B-A block copolymers due to the high melt temperatures required. Furthermore, the A-block compatible resins may compromise the integrity of the polyphenylene ether/styrene domain because the A-block compatible resins have relatively low glass transition temperatures ($T_g$).

WO 90/14397 to Audett discloses an adhesive mixture prepared by blending an A-B-A block copolymer, tackifier and a polyphenylene oxide polymer having a $T_g$ range of 100° to 165° C., preferably 140° to 163° C. According to Audett, a significant advantage is obtained by using PPO having a lower $T_g$ than the PPO disclosed in U.S. Pat. Nos. 4,104,323 and 4,141,876 since higher $T_g$ PPO resins cannot be hot melt processed unless they are preblended with low molecular weight aromatic resins such as polystyrene.

However, conventional PPO having a $T_g$ in the range of 100° to 165° C. is not effective for use in increasing the upper service temperature and adhesive properties of an A-B-A block copolymer adhesive because the PPO typically has a broad molecular weight distribution which ranges from a few hundred to over ten thousand. The broad molecular weight distribution of the PPO has a significant adverse impact on the properties of the A-B-A block copolymer. The low molecular weight portions of the PPO having molecular weights of less than 1000 Daltons may enter the B block phase of a copolymer such as polystyrene-polybutadiene-polystyrene block copolymer thereby changing the viscoelastic properties of the mid-block which reduces the elastic and adhesive properties of the block copolymer. Furthermore, the high molecular weight portions of the PPO having a molecular weight of more than 10,000 Daltons could separate from the endblock phase resulting in a partially incompatible mixture particularly for end-blocks having molecular weights of less than 10,000 Daltons. The resulting A-B-A block copolymer would therefore have poor adhesive properties.

Hence, there is a need for a composition and/or formulation method which can be used to increase the upper service temperature of A-B-A block copolymers used for hot melt adhesives without degrading the copolymer.

It is known that tetramethyl polycarbonate (TMPC) is compatible with polystyrene homopolymers. However, conventional TMPC is not miscible with graft or random copolymers containing polystyrene and is not compatible with block copolymers having polystyrene end blocks. As a consequence, conventional TMPC has not been thought to be very useful for increasing the upper service temperatures of adhesive compositions containing triblock copolymers with styrenic end groups.

It is therefore an object of the invention to provide an improved hot melt/pressure sensitive adhesive formulation.

Another object of the invention is to provide an adhesive formulation having significantly elevated shear adhesion failure temperatures (SAFT) and improved high-temperature peel strengths.

A further object of the invention is to provide compositions which will enable melt blending of a tetramethyl polycarbonate with an A-B-A block copolymer in amounts effective to substantially increase the upper service temperature of the copolymer.

Still another object of the invention is to provide a method for increasing the holding power of hot melt and pressure sensitive adhesives.

Yet another object of the invention is to provide a method for significantly increasing the shear adhesion failure temperature (SAFT) and high-temperature peel strength of an adhesive formulation containing an A-B-A block copolymer without significantly disaffecting other properties of the formulation.

SUMMARY OF THE INVENTION

With regard to the foregoing and other objects and advantages, the present invention provides an additive composition for increasing the upper service temperature of an A-B-A block copolymer adhesive composition with styrenic A blocks and a diene midblock which comprises a blend containing from about 5 to about 45 parts by weight of an A-block compatible reinforcing resin and from about 1 to about 450 parts of a B-block compatible resin. The A-block compatible reinforcing resin is preferably selected from the group consisting of polyphenylene oxides (PPO) or ethers and tetramethylpolycarbonate-based resins (TMPC resins) having polydispersity indices less than about 4.0 and number average molecular weights ranging from about 2,000 to about 10,000 Daltons. This is to be contrasted with conventional TMPC and PPO which have a $T_g$ above about 210° C., a polydispersity index above about 4.0 and a number average molecular weight above about 10,000 Daltons. Such materials would not be effective in adhesive compositions such as hot melt glues because they are far too hard and could not be compounded with the A-B-A copolymer except at temperatures which would be so high they would be damaging to the properties of the composition.

The invention represents a departure from and an advance over existing technology in terms of the approach employed for adding reinforcing components to A-B-A block copolymers. According to conventional wisdom, it is typically necessary to use A-block compatible resins for associating reinforcing compounds with the A-block components of the A-B-A block copolymer. It has now been found that a pre-blend of an A-block reinforcing resin having a $T_g$ in the range of from about 135° to about 210° C. with a B-block compatible resin may be used to effectively incorporate relatively large amounts of the reinforcing resin into the A-B-A block copolymer adhesive formulation in association with the A-blocks using much lower processing temperatures. Since more of the reinforcing resin may be incorporated into the adhesive composition, the adhesive will exhibit significantly higher shear adhesion failure temperatures (SAFT) and higher peel strengths than adhesive compositions prepared by blending reinforcing resins with A-block compatible resins or by using reinforcing resins having conventional glass transition temperatures.

The B-block compatible resins are preferably selected from the group consisting of $C_5$–$C_9$ resins, dicyclopentadiene, aromatic modified terpenes, terpene phenols, alkyl phenols, rosin phenols, rosin esters, polymerized rosin and mixtures of two or more of the foregoing. Suitable B-block compatible resins have a $T_g$ within the range of from about 0° to about 100° C. Preferably, the B-block compatible resin has a $T_g$ in the range of from about 55° C. to about 80° C. in order to achieve compatibility with the mid-block.

According to another aspect of the invention, a method is provided for making an A-B-A block copolymer adhesive composition which exhibits improved properties. The method comprises first preblending, at an elevated temperature, from about 10 to about 200 parts by weight TMPC or PPO having a $T_g$ within the range of from about 135° to about 210° C. with from about 1 to about 450 parts by weight of a B-block compatible resin in order to provide a TMPC/B-block or PPO/B-block resin blend. Next, the resin blend is mixed with an A-B-A block copolymer at a temperature below about 180° C. in an amount effective to form an adhesive composition exhibiting a shear adhesion failure temperature within the range of from about 185° to about 222° C. and a 180° peel strength ranging from about 3 to about 7 pounds per inch.

BRIEF DESCRIPTION OF THE DRAWING

Advantages of the compositions and methods of the invention are illustrated in FIG. 1 which is a graphical representation of the rheological properties of formulations with and without the compositions of the present invention.

DETAILED DESCRIPTION OF THE PREFERRED EMBODIMENTS

Figure 1:
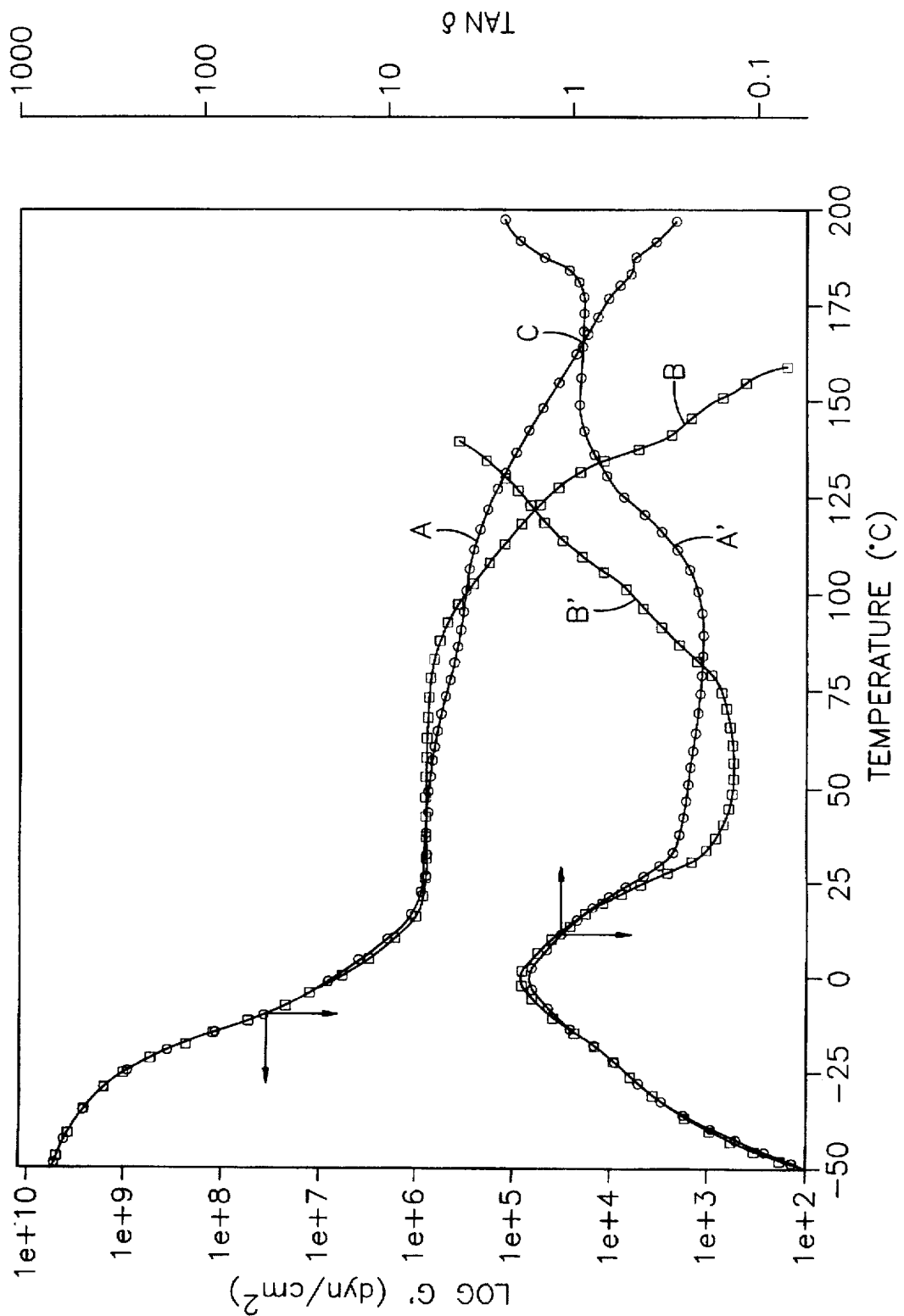

Adhesive compositions improved by use of the invention include an A-B-A block copolymer which is comprised of at least two monoalkenyl arene polymer end blocks (the "A-blocks") and at least one elastomeric conjugated diene polymer midblock (the "B-block" or B-midblock"). In the A-B-A block copolymer, the B-block confers elastomeric properties to the 0 copolymer whereas the A-blocks provide reinforcement properties to the adhesive formulation by physically cross-linking with other A-blocks of the copolymer. The number of blocks of the copolymer is not of special importance and the macromolecular configuration of the copolymer may be linear or radial depending upon the method by which the block copolymer is formed. For most adhesive/hot melt applications, the molecular weight of the A-B-A block copolymer will be in the range of from about 30,000 to about 300,000 Daltons. The A-B-A block copolymer may be hydrogenated or partially hydrogenated, with the hydrogenated forms being preferred for applications such as polystyrene-polyethylene-polystyrene and polystyrene-polybutylene-polystyrene block copolymers, for example.

A hot melt adhesive is made by formulating the A-B-A block copolymer with a tackifier resin which is compatible with the B-block of the copolymer. Such adhesive formulations are flowable and tacky under certain high temperature conditions and are relatively flexible and provide cohesive properties at temperatures below their softening points.

The monoalkenyl arene monomers used in the A-blocks of the copolymer to confer reinforcing properties to adhesive compositions may contain 8 to 16 carbon atoms and include, but are not limited to, styrene, 3-methylstyrene, 4-n-propylstyrene, 4-p-tolylstyrene, 1-vinylnaphthalene, 2-vinylnaphthalene, tert-butyl styrene and other ring alkylated styrenes as well as mixtures of two or more of the foregoing. Typically, the A-block of the copolymer, in the absence of TMPC or PPO, will have an effective $T_g$ of about 95° to about 100° C. and a molecular weight of about 10,000 to about 11,000 Daltons. Thus, the upper service temperature of the conventional copolymer is about 95° to about 100° C. without the use of TMPC or PPO to increase the service temperature.

The conjugated diene monomers used in the B midblocks of the copolymer may contain 4 to 8 carbon atoms and may be hydrogenated or non-hydrogenated. Examples of suitable conjugated diene monomers include, but are not limited to, 1,3-butadiene, isoprene, 2,3-dimethyl-1,3-butadiene, piperylene, 3-butyl-1,3-octadiene, 1-phenyl-1,3-butadiene and mixtures thereof. Preferred A-B-A block copolymers include polystyrene-polyisoprene-polystyrene, polystyrene-polybutadiene-polystyrene and poly(α-methylstyrene)-polyisoprene-poly(α-methylstyrene). A typical radial polymer may include one in which the diene block has three or more branches with the tip of each branch being connected to a polystyrene block.

The TMPC additive composition used to increase the upper service temperature of L 0 an A-B-A block copolymer according to the invention comprises a blend containing TMPC and a B-block compatible resin. A preferred TMPC of the blend according to the invention has the formula:

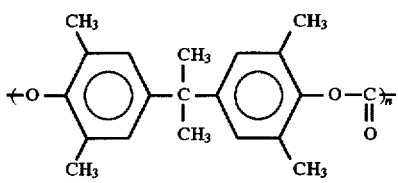

wherein n is an integer greater than 10 and less than about 35, and the polymer has a polydispersity index of less than about 4.0, preferably less than about 3.0. A low molecular weight TMPC compound may be prepared by dissolving tetramethyl bisphenol-A (TMBPA) in a sodium hydroxide solution. Triphosgene, in substantially equal molar ratio to the bisphenol-A, is dissolved in methylene chloride under a nitrogen atmosphere in a reaction vessel. The solution of TMBPA is slowly added to the triphosgene solution with vigorous stirring. A phase transfer catalyst such as triethylamine may be used to enhance the polymerization process. It is preferred that the molarity of the catalyst be about one-tenth to two-tenths that of the TMBPA monomer. Reaction temperature is maintained about 25° C. and the pH of the reaction mass is maintained at about 11 during the polymerization reaction. Control of the molecular weight of the TMPC reaction product is by polymerization time and the molarity of the catalyst.

The amount of TMPC incorporated into the adhesive formulation may range from about 10 to about 200 wt. % of the polystyrene (PS) end-block weight for a styrene-isoprene-styrene (SIS) A-B-A block copolymer, which typically translates to about 4 to about 40 percent by weight of the total elastomer weight in the final formulation. Below about 10 wt. % TMPC (wt./wt. on PS) there may still be some improvement in adhesive properties, but above about 200 wt. % (wt./wt. on PS) the mobility of the polyisoprene rubbery phase may be restricted thus leading to a decrease in desirable rheological properties such as tack. For polybutadiene midblock rubbery phases, the maximum useful amount of TMPC may be as low as 75 wt. % of the PS end block weight.

The PPO additive composition used to increase the upper service temperature of an A-B-A block copolymer according to the invention comprises a blend containing PPO and a B-block compatible resin. A preferred PPO of the blend according to the invention has the formula:

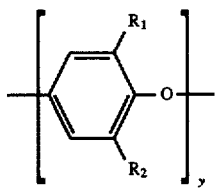

wherein $R_1$ is a monovalent substituent selected from the group consisting of hydrogen, hydrocarbon radicals free of tertiary a-carbon atoms, halohydrocarbon radicals having at least two carbon atoms between the halogen atom and the phenol nucleus and being free of tertiary α-carbon atoms, hydrocarbonoxy radicals free of tertiary α-carbon atoms, and halohydrocarbonoxy radicals having at least two carbon atoms between the halogen atom and the phenol nucleus and being free of tertiary α-carbon atoms; $R_2$ is the same as $R_1$ and in addition a halogen atom; and y is an integer greater than 10 and less than about 65. Methods for preparing such PPO resins are well known and are disclosed, for example, in U.S. Pat. Nos. 3,257,357; 3,257,358; 3,306,874 and 3,306,875, all of which are incorporated herein by reference as if fully set forth.

Typical examples of monovalent hydrocarbon radicals $R_1$ and $R_2$ are alkyl, including cycloalkyl, e.g., methyl, ethyl, propyl, isopropyl, butyl, secondary butyl, isobutyl, cyclobutyl, amyl, cyclopentyl, hexyl, cyclohexyl, methylcyclohexyl, ethylcyclohexyl, octyl, decyl, octadecyl, and the like; alkenyl, including cycloalkenyl, e.g., vinyl, allyl, butenyl, cyclobutenyl, isopentyl, cyclopentenyl, linolyl, and the like; alkynyl, e.g., propargyl; aryl, including alkaryl, e.g., phenyl, tolyl, ethylphenyl, xylyl, naphthyl, methylnaphthyl and the like; aralkyl, e.g., benzyl, phenylethyl, phenylpropyl, tolylethyl and the like. The monovalent halohydrocarbon radicals may be the same as the hydrocarbon radicals, as outlined above, except methyl and α-haloalkyl radicals, wherein one or more of the hydrogen atoms are replaced by halogen to produce halohydrocarbon radicals having at least two carbon atoms between the halogen and the free valence. Examples of monovalent halohydrocarbon radicals include 2-chloroethyl, 2-bromoethyl, 2-fluoroethyl, 2,2-dichloroethyl, 2- and 3-bromopropyl, 2,2-difluoro-3-iodopropyl, 2-, 3- and 4-bromobutyl, 2-, 3-,4- and 5-fluoroamyl, 2-chlorovinyl, 2- and 3-bromoallyl, 2- and 3-fluoropropargyl, mono-, di-, tri-, tetra- and penta-chlorophenyl, mono-, di-, tri- and tetrabromotolyl, chloroethylphenyl, ethylchlorophenyl, fluoroxylyl, chloronaphthyl, bromo-benzyl, iodophenylethyl, phenylchloroethyl, bromotolyl-ethyl and the like.

Examples of the monovalent hydrocarbonoxy radicals include methoxy, ethoxy, propoxy, isopropoxy, butoxy, secondary butoxy, tertiary butoxy, amoxy, hexoxy, octoxy, decoxy, vinoxy, alloxy, butenoxy, propargoxy, phenyloxy, toloxy, ethylphenoxy, naphthoxy, methylnaphthoxy, benzoxy, phenylethoxy, phenylpropoxy, tolylethoxy and the like. The monovalent halohydroxycarbonoxy radicals may be the same as the above oxyhydrocarbon radicals except methoxy and α-haloalkoxy radicals, where one or more of the hydrogens are replaced by a halogen, i.e., fluorine, chlorine, bromine, or iodine, to produce halohydrocarbonoxy radicals having at least two carbon atoms between the halogen and the free valence. Examples of halohydroxycarbonoxy radicals include 2-chloroethoxy, 2-bromoethoxy, 2-fluoroethoxy, 2,2-dichloroethoxy, - and 3-bromopropoxy, 2,2-difluoro-3-chloropropoxy, 2-, 3- and 4-iodobutoxy, 2-, 3-, 4- and 5-fluoroamoxy, 2-chlorovinoxy, 2- and 3-bromoalloxy, 2- and 3-fluoropropargoxy, mono-, di-, tri-, tetra- and pentachlorophenoxy, mono-, di-, tri- and tetrabromotoloxy, chloroethylphenoxy, ethylchlorophenoxy, iodoxyloxy, chloronaphthoxy, bromobenzoxy, chlorophenylethoxy, phenylchloroethoxy, bromotolylethoxy and the like.

The amount of PPO resin incorporated into the adhesive formulation may range from about 10 to about 120 wt. % of the polystyrene (PS) end-block weight for a styrene-isoprene-styrene (SIS) copolymer which translates to about 4 to about 30 percent by weight of the total elastomer weight in the final formulation. Below about 10 wt. % PPO (wt./wt. on PS) there may still be some improvement in adhesive properties, but above 120 wt.% (wt./wt. on PS) the mobility of the polyisoprene rubbery phase may be restricted thus leading to a decrease in desirable 5 rheological properties such as tack. For polybutadiene rubbery phases, the maximum useful amount of PPO may be as low as 50 wt. % of the PS end block weight.

Another component of the pre-blend is a B-block compatible resin. Suitable B-block compatible resins may be selected from $C_5$–$C_9$ resins, dicyclopentadiene, aromatic modified terpenes, terpene phenols, alkyl phenols, rosin phenols, rosin esters, polymerized rosin and mixtures of two or more of the foregoing preferably having a $T_g$ within the range of from about 0° to about 100° C., more preferably within the range of from about 40° to about 90° and most preferably within the range of from about 55° to about 80° C. These B-block compatible resins would therefore exhibit ring and ball softening points within the range of from about 25° C. to about 135°, preferably within the range of from about 85° C. to about 115° C.

The B-block resin should have an aromatic content below about 35 wt. %, preferably below about 30 wt. % in the range of from about 15 to about 25% by weight aromatic so that the B-block resin will exhibit compatibility with the PPO or TMPC reinforcing agent for blending purposes but will not exhibit a significant degree of compatibility with the styrenic end blocks.

With regard to the amount of TMPC or PPO in the blend, the weight ratio of TMPC or PPO to B-block compatible resin may generally be within the range of from about 1:10 to about 5:1, preferably within the range of from about 1:7 to about 1:1. More TMPC or PPO in the blend than about 5:1 is not desired due to the higher temperatures and longer processing times which may be required to adequately form the blend. Likewise, very high quantities of B-block compatible resin in the blend, e.g., more than about 10 parts per part of TMPC or PPO, may have a deleterious effect on the holding power and high temperature strength of the adhesive composition and thus are preferably avoided.

Blends of the TMPC or PPO and B-block compatible resin may be made by first heating the B-block compatible resin to its normal process temperature of about 190° to about 220° C. under an inert atmosphere in an agitated mixing vessel. Inert atmospheres which may be used include nitrogen, argon and the like. Once the B-block compatible resin has reached process temperature, the TMPC or PPO is slowly added to the molten B-block resin with agitation until an essentially homogeneous blend of TMPC/B-block or PPO/B-block resin is formed. The resulting essentially homogeneous blend of TMPC or PPO/B-block compatible resin has a lower viscosity and softening temperature than pure TMPC or PPO resin and, at room temperature, the blend is substantially transparent or semi-translucent.

While not preferred, the B-block compatible resin may also be added to TMPC or PPO. The addition of B-block compatible resin to TMPC or PPO may be by the use of a solvent, however, it is preferred to make the blends of TMPC or PPO and the B-block compatible resin in the absence of solvent.

Once the blend of B-block compatible resin and TMPC or PPO is made, the blend is mixed by stirring until an essentially homogenous blend of TMPC/B-block compatible or PPO/B-block compatible resin is formed. The blended resin may be then be pelletized, cooled to a solid and stored for later addition to a block copolymer.

An adhesive formulation containing the resin blend may be made by melt blending the TMPC/B-block compatible or PPO/B-block compatible resin blend and an A-B-A block compatible copolymer with mixing at a temperature in the range of from about 190° to about 220° C. to produce a mixture. Because the TMPC or PPO is first blended with the B-block compatible resin, a lower temperature may be used than would be used to blend the TMPC or PPO with the A-B-A block copolymer.

In an alternative process, the B-block compatible resin, TMPC or PPO is melt blended at a temperature in the range of from about 190° to about 220° C. under an inert gas atmosphere. The blend of B- block compatible resin and TMPC or PPO is then mixed with an A-B-A block copolymer to produce an adhesive having a higher upper service temperature.

In addition to the adhesion enhancing blend of TMPC or PPO/B-block compatible resin, adhesive compositions of the invention may contain at least one tackifier resin. Typical tackifier resins which may be used include polyolefins, polymerized mixed olefins, mixed esters of polymerized rosin, glycerol and glycol esters of rosin, pentaerythritol ester of rosin, polydipentene, aromatic-modified polyterpenes, aromatic-modified $C_5$ copolymers, aromatic resins and mixtures thereof. The tackifier resin may be added to the TMPC or PPO/B-block compatible resin blend during blending, or it may be mixed with the A-B-A block copolymer before, during or after mixing the TMPC or PPO/B-block compatible blend with the block copolymer. The weight ratio of tackifier resin to A-B-A block copolymer in the adhesive composition ranges from about 1:5 to about 10:1, preferably from about 1:2 to about 5:1 and most preferably from about 1:1 to about 1:1 to about 1.5:1.

Another useful ingredient of adhesive compositions according to the invention may be a stabilizer, depending on the particular application. Any stabilizer compound known to impart antioxidant characteristics may be used. Accordingly, the stabilizer compound may be selected from materials such as hindered phenols, amines, metal dialkyldithiocarbamates, thioesters and the like.

Adhesives formulations also often contain mineral oils or extender oils to improve the adhesive properties of the formulations. Suitable extender oils include the naphthenic extender oils and the paraffinic oils having a substantially linear structure.

The following nonlimiting examples are provided to further illustrate various aspects of the invention.

EXAMPLE 1

Three blends were prepared by melt blending a B-block compatible resin (ZONATAC 105 having a ring and ball softening point of 103° C. ($T_g$ about 55° C.) commercially available from Arizona Chemical Company of Panama City, Fla.), an A-block compatible resin (KRYSTALEX 3100, a mostly α-methyl-styrene resin having a ring and ball softening point of 100° C. commercially available from Hercules Incorporated of Wilmington, Del.) and another A-block compatible resin consisting of a low molecular weight polystyrene having a ring and ball softening point of 102° C. with PPO 940001 resin, available from the GE Plastics Company of Selkirk, N.Y., at a weight ratio of 1:1 and at a temperature of 220° C. These PPO/resin blends were compared against ENDEX 155 resin, a commercially available A-block reinforcing resin from Hercules, Incorporated. The three PPO/resin blends imparted neat complex viscosities comparable to ENDEX 155 resin between 160° and 180° C., which is a typical processing temperature range for hot melt adhesives.

The PPO/resin blends were then formulated into a permanent label adhesive formulations as shown in Tables 1–3 so each one had the same weight percent of A-block compatible or B-block compatible resins. Each adhesive composition was melt coated onto MYLAR film and cooled so that the total thickness of coating was 1 mil. The adhesives were then analyzed to determine their SAFT (°F.), shear (min.), 180° Peel (lbs/inch), polyken probe tack (grams) and endblock $T_g$ (by RDS II °C.).

TABLE 1

| Component (parts by weight) | Sample #1 | Sample #2 | Sample #3 | Sample #4 | Sample #5 | Sample #6 | Sample #7 | Sample #8 |
|---|---|---|---|---|---|---|---|---|
| KRATON 1107[1] | 100 | 100 | 100 | 100 | 100 | 100 | 100 | 100 |
| SHELLFLEX 371[2] | 40 | 40 | 40 | 40 | 40 | 40 | 40 | 40 |
| IRGANOX 1010[3] | 2 | 2 | 2 | 2 | 1 | 1 | 1 | 1 |
| WINGTACK 95[4] | 126 | 140 | 140 | 140 | 126 | 140 | 140 | 140 |
| PPO 940001[5] | 14 | 7 | 7 | — | — | — | — | — |
| PPO P940203B[6] | — | — | — | — | 14 | 14 | — | — |
| B-block Resin | | | | | | | | |
| ZONATAC 105[7] | 14 | — | — | — | 14 | — | — | — |
| A-block Resins | | | | | | | | |
| polystyrene (1818-2)[8] | — | 7 | — | — | — | — | — | — |
| KRYSTALEX 3100[9] | — | — | 7 | — | — | — | — | — |
| ENDEX 155[10] | — | — | — | 14 | — | — | — | 14 |
| Adhesive Properties | | | | | | | | |
| SAFT (°F.)[11] | 219 | 203 | 207 | 187 | 216 | 220 | 176 | 189 |
| Shear (min.) | 538 | 587 | 253 | 545 | 2344 | 2982 | 153 | 1820 |
| 180° Peel (lbs/inch)[12] | 4.9 | 5.0 | 4.8 | 5.5 | 5.3 | 6.1 | 5.0 | 3.6 |
| Polyken Probe tack[13] (grams) | 1062 | 1139 | 1120 | 1312 | 1444 | 1342 | 1333 | 1414 |
| Endblock $T_g$ (by RDS II °C.) | — | — | — | — | 158 | 159 | 122 | 131 |

[1] KRATON 1107 - styrene-isoprene-styrene copolymer having block molecular weights of about 13,000-160,000-13,000.
[2] SHELLFLEX 371 - a naphthenic extender oil.
[3] IRGANOX 1010 - a high molecular weight hindered phenol antioxidant.
[4] WINGTACK 95 - a diene-olefin tackifier resin.
[5] PPO 940001 - polyphenylene oxide having a $T_g$ of 158° C. and an $M_n$ of 1647 by vapor phase gas chromatographic analysis.
[6] PPO P940203B - polyphenylene oxide having a $T_g$ of 157° C. and an $M_n$ of 1580 by vapor phase gas chromatographic analysis.
[7] ZONATAC 105 - B-block compatible resin prepared by the cationic polymerization of limonene and styrene having a ring and ball softening point of about 105° C.
[8] polystyrene (1818-2) - low molecular weight polystyrene $M_n$ = 1029, $M_w$ = 3112.
[9] KRYSTALEX 3100 - a mostly α-methyl styrene resin.
[10] ENDEX 155 - a commercial A-block reinforcing resin.
[11] SAFT - Shear Adhesion Failure Test (ASTM D-4498-85) - In the SAFT test, a 1 inch by 1 inch overlap of MYLAR coated adhesive tape to a stainless steel substrate is made using a 4.5 pound roller. A 1 kg weight is then hung from the tape and the assembly is placed in an oven. The temperature of the oven is increased at 40° F. per hour and the temperature at which the weight dropped is recorded as the SAFT.
[12] 180° Peel (ASTM D-903-93) - The 180° peel test involves placing a length of tape on a stainless steel plate and laminating it with a 4.5 pound roller. The force (lbs/inch) required to peel the tape at 180° angle on an Instron instrument is recorded.
[13] Polyken Probe Tack (ASTM D-2979-88) - In the polyken probe tack test, a steel probe contacts the adhesive tape with a specified force for a 1 second dwell time. The force required to break the bond between the adhesive and the stainless steel probe is measured in grams.

TABLE 2

| Component (parts by weight) | Sample #9 | Sample #10 | Sample #11 | Sample #12 | Sample #13 |
|---|---|---|---|---|---|
| SOL T 168[14] | 100 | 100 | 100 | 100 | 100 |
| SHELLFLEX 371 | 50 | 50 | 50 | 50 | 50 |
| IRGANOX 1010 | 5 | 5 | 5 | 5 | 5 |
| PPO 940204A[15] | — | — | — | 22 | — |
| PPO P940203B | — | 43 | 22 | — | 22 |
| B-block Resin | | | | | |
| ZONATAC 105 | 150 | 150 | 150 | 150 | — |
| BEVELITE 62-107[16] | — | — | — | — | 150 |
| Adhesive Properties | | | | | |
| SAFT (°F.) | 145 | — | 189 | — | — |
| Shear (min.) | 9932 | — | 11,000+ | — | — |
| 180° Peel (lbs/inch) | 4.1 | — | 4.5 | — | — |
| Polyken Probe tack (grams) | 1069 | 12 | 663 | 647 | 236 |
| Thickness (mils) | 1.1 | 1.5 | 1.4 | 1.4 | 1.4 |

[14] SOL T 168 - styrene-isoprene-styrene block copolymer having 25 weight % styrene.
[15] PPO P940203A - polyphenylene oxide having a $T_g$ of 175° C. and an $M_n$ of 2105 by vapor phase gas chromatographic analysis.
[16] BEVELITE 62-107 - rosin ester of pentaerythritol.

TABLE 3

| Component (parts by weight) | Sample #14 | Sample #15 | Sample #16 | Sample #17 | Sample #18 | Sample #19 | Sample #20 | Sample #21 |
|---|---|---|---|---|---|---|---|---|
| styrene-isoprene-styrene copolymer | 100 | 100 | 100 | 100 | 100 | — | — | — |
| styrene-butadiene-styrene copolymer | — | — | — | — | — | 100 | 100 | 100 |
| WINGTACK 95 | 100 | 100 | 100 | 90 | 43 | — | — | — |
| ARKON P-90[17] | — | — | — | — | — | — | — | 128 |
| IRGANOX 1010 | 1 | 1 | 1 | 1 | 1 | 2 | 2 | 2 |
| PPO 940001 | — | — | — | 10 | 10 | — | 21.5 | 21.5 |
| B-block Resin | | | | | | | | |
| ZONATAC 105L | — | — | — | 10 | 57 | 150 | 150 | 21.5 |
| A-block Resins | | | | | | | | |
| ENDEX 155 | — | 10 | — | — | — | — | — | — |
| ENDEX 160[18] | — | — | 10 | — | — | — | — | — |
| Adhesive Properties | | | | | | | | |
| SAFT (°F.) | 177 | 189 | 190 | 222 | 208 | 146 | 185 | 188 |
| Shear (min.) | 180 | 316 | 316 | 597 | 499 | 3269 | 10,000+ | 10,000+ |
| 180° Peel (lbs/inch) | 5.6 | 5.5 | 5.5 | 5.1 | 4.0 | 6.4 | 5.3 | 4.9 |
| Polyken Probe tack (grams) | 1148 | 1477 | 1291 | 1280 | 1124 | 1227 | 625 | 1103 |
| Thickness (mils) | 1 | 1 | 1 | 1 | 1 | 1 | 1 | 1 |

[17]ARKON P-90 - a hydrogenated cyclic hydrocarbon resin.
[18]ENDEX 160 - a commercial A-block reinforcing resin.

In the foregoing Tables, Samples 1, 5, 10, 11, 12, 13, 17-18 and 20-21 represent compositions of the invention containing a blend of PPO and B-block compatible resin. Samples 4, 8, 15 and 16 contain only a commercial A-block reinforcing resin. Samples 2 and 3 represent prior art adhesive compositions containing a PPO/A-block compatible resin blend.

As illustrated by the foregoing example, PPO/B-block compatible blends have at least two advantages over PPO/A-block compatible blends. The PPO/B-block compatible blends enable a higher level of PPO to be incorporated into the adhesive composition without significantly compromising the integrity of the PPO-reinforced polystyrene endblocks, while producing adhesive blends with similar softening points. In comparison, since the A-block compatible resins are totally miscible with the PPO-reinforced polystyrene endblocks (A-blocks), the endblock's average softening point, as represented by the SAFT value, is reduced. Adhesive formulations of the invention also exhibit little or no decrease in tack and have equivalent or greater peel strength as compared to adhesive formulations prepared using A-block compatible resins.

EXAMPLE 2

Permanent label adhesive formulations were prepared by melt blending 140 pounds per hundred weight of A-B-A block copolymer resin (phr) of a B-block compatible resin (WINGTACK 95, a $C_5$ diene-olefin tackifier resin) commercially available from Arizona Chemical Company of Panama City, Fla.) with 100 phr of a styrene-isoprene-styrene copolymer having block molecular weights of about 13,000-160,000-13,000 (KRATON 1107 commercially available from Shell Chemicals of Houston Tex., 40 phr of a naphthenic extender oil (SHELLFLEX 371, commercially available from Shell Chemicals and 1 phr of a high molecular weight hindered phenol antioxidant (IRGANOX 1010, commercially available from Ciba-Geigy Corporation of Hawthorne, N.Y.). The first blend only contained the above components. The second blend was prepared by first preblending 14 phr TMPC having a number average molecular weight of 3500 and a weight average molecular weight of 5200 as determined by gel permeation chromatography and a $T_g$ of 153° C. with the B-block compatible resin (WINGTACK 95) before the B-block resin is added.

Each adhesive composition was melt coated onto MYLAR film and cooled so that the total thickness of coating was 1 mil. The adhesives were then analyzed to determine their SAFT (°F.), shear (min.), 180° Peel (lbs/inch), polyken probe tack (grams) and end block $T_g$ (by RDS II °C.).

TABLE 4

| Component (parts by weight) | Sample #1 | Sample #2 |
|---|---|---|
| KRATON 1107[1] | 100 | 100 |
| SHELLFLEX 371[2] | 40 | 40 |
| IRGANOX 1010[3] | 1 | 1 |
| WINGTACK 95[4] | 140 | 140 |
| TMPC 3500[5] | — | 14 |
| Adhesive Properties | | |
| SAFT (°F.) | 171 | 200 |
| Shear (min.) | 57 | 475 |
| 180° Peel (ounce/inch) | 54 | 65 |
| Polyken Probe tack (grams) | 935 | 920 |
| End block $T_g$ (by RDS II °C.) | — | — |

[1]KRATON 1107—a styrene—isoprene—styrene copolymer having block molecular weights of about 13,000-160,000-13,000
[2]SHELLFLEX 371—a naphthenic extender oil.
[3]IRGANOX 1010—a high molecular weight hindered phenol antioxidant.
[4]WINGTACK 95—a $C_5$ diene-olefin tackifier (polyterpene) resin.
[5]TMPC 3500—a tetramethyl polycarbonate having a $T_g$ of 153° C. and an $M_n$ of 3500 by gel permeation chromatographic analysis.

In the foregoing Table, Sample 2 represent a composition of the invention containing a blend of TMPC and B-block compatible resin. Sample 1 contains only a commercial B-block reinforcing resin. FIG. 1 shows the rheological result obtained by using a blend of TMPC and a B-block compatible resin in a styrene-isoprene-styrene (SIS) adhesive formulation (Curves A and A') as compared to an adhesive formulation which doesn't contain TMPC (Curves B and B'). As shown in FIG. 1, there is a significant extension of the rubber plateau (G') to a higher temperature as a result of the increase in the glass transition temperature of the end block (Point C on Curves A and A') obtained by the use of the TMPC blend according to the invention. More importantly, there is little change in either the plateau height or the glass transition temperature, which indicates that adding TMPC can improve the high temperature performance without sacrificing other adhesive properties such as tack and peel strength of the adhesive formulation.

Having described and illustrated the invention and preferred embodiments thereof, it will be recognized by those of ordinary skill that variations of the invention are within the spirit and scope of the appended claims.

What is claimed is:

1. An additive composition for increasing the upper service temperature of an A-B-A block copolymer adhesive composition with styrenic A-blocks and an elastomeric conjugated diene midblock B, the additive comprising a blend containing from about 5 to about 45 parts by weight of an A-block compatible reinforcing resin selected from the class consisting of tetramethyl polycarbonate-based resins (TMPC resins) having polydispersity indices of less than about 4.0 and number average molecular weights ranging from about 2,000 to about 10,000 Daltons and from about 1 to about 450 parts by weight of a B-block compatible resin, wherein the B-block compatible resin has a glass transition temperature ($T_g$) within the range of from about 0° to about 100° C.

2. The composition of claim 1 wherein the B-block compatible resin is selected from the group consisting of aromatic modified terpenes, terpene phenols, rosin esters, polymerized rosin, $C_5$–$C_9$ resins, dicyclopentadiene and mixtures thereof, which B-block compatible resins have a glass transition temperature ($T_g$) within the range of from about 0° to about 100° C.

3. The composition of claim 1 wherein the B-block compatible resin has a $T_g$ in the range of from about 55° C. to about 80° C. and an aromatic content in the range of from about 15 to about 25% by weight.

4. An additive composition for increasing the upper service temperature of an A-B-A block copolymer adhesive composition having styrenic A-blocks and an elastomeric conjugated diene midblock B, the additive comprising a blend containing from about 10 to about 40 parts by weight of tetramethyl polycarbonate (TMPC) and from about 1 to about 450 parts by weight of a B-block compatible resin, wherein the TMPC has a glass transition temperature ($T_g$) within the range of from about 130° to about 185° C. and a polydispersity index of less than about 4.0.

5. The composition of claim 4 wherein the TMPC has a number average molecular weight ranging from about 2,000 to about 10,000 Daltons.

6. The composition of claim 4 wherein the B-block compatible resin is selected from the group consisting of aromatic modified terpenes, terpene phenols, rosin esters, polymerized rosin, $C_5$–$C_9$ resins, dicyclopentadiene and mixtures thereof, which B-block compatible resins have a glass transition temperature ($T_g$) within the range of from about 0° to about 100° C.

7. The composition of claim 6 wherein the B-block compatable resin has a $T_g$ in the range of from about 55° C. to about 80° C. and an aromatic content in the range of from about 15 to about 25% by weight.

8. An additive composition for increasing the upper service temperature of an A-B-A block copolymer adhesive composition with styrenic A-blocks and an elastomeric conjugated diene midblock B, the additive comprising a blend containing from about 5 to about 45 parts by weight of an A-block compatible reinforcing resin selected from the class consisting of tetramethyl polycarbonate-based resins (TMPC resins) having polydispersity indices of less than about 4.0 and number average molecular weights ranging from about 2,000 to about 10,000 Daltons and from about 1 to about 450 parts by weight of a B-block compatible resin selected from the group consisting of aromatic modified terpenes, terpene phenols, rosin esters, polymerized rosin, $C_5$–$C_9$ resins, dicyclopentadiene and mixtures thereof.

9. The composition of claim 8 wherein the B-block compatible resin has a glass transition temperature ($T_g$) within the range of from about 0° to about 100° C.

10. The composition of claim 8 wherein the B-block compatible resin has a glass transition temperature ($T_g$) within the range of from about 55° to about 80° C. and an aromatic content in the range of from about 15 to about 25% by weight.

* * * * *

UNITED STATES PATENT AND TRADEMARK OFFICE
CERTIFICATE OF CORRECTION

PATENT NO : 5,789,474
DATED : August 4, 1998
INVENTOR(S) : Xinya Lu and Wayne K. Chu It is certified that error appears in the above-identified patent and that said Letters Patent is hereby corrected as shown below:

Column 1, line 5, after "continuation-in-part" insert -- copending --.

Column 4, line 13, after "the" delete "0".

Column 4, line 64, after "temperature" delete "L 0".

Column 5, line 32, change "fmal" to -- final --.

Column 5, line 37, change "Theological" to -- rheological --.

Column 5, line 57, change "a-carbon" to -- α-carbon --.

Column 8, line 8, change "polyolefms" to -- polyolefins --.

Column 11, line 53, change "diene-olefm" to -- diene-olefin --.

Column 14, line 15, change "6" to -- 4 --.

Signed and Sealed this

Twenty-fourth Day of November, 1998

Attest:

BRUCE LEHMAN

*Attesting Officer*     *Commissioner of Patents and Trademarks*